(12) United States Patent
Tsai

(10) Patent No.: US 10,499,036 B2
(45) Date of Patent: Dec. 3, 2019

(54) IMAGE SENSING MODULE

(71) Applicant: Lite-On Technology Corporation, Taipei (TW)

(72) Inventor: Ching-Lung Tsai, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 15/989,212

(22) Filed: May 25, 2018

(65) Prior Publication Data

US 2018/0352210 A1 Dec. 6, 2018

Related U.S. Application Data

(60) Provisional application No. 62/516,075, filed on Jun. 6, 2017.

(30) Foreign Application Priority Data

Mar. 14, 2018 (CN) .......................... 2018 1 0207632

(51) Int. Cl.
*H04N 13/204* (2018.01)
*H04N 13/271* (2018.01)
*H04N 5/33* (2006.01)
*H04N 5/225* (2006.01)
*H04N 5/222* (2006.01)
*H04N 5/232* (2006.01)
*G01S 17/89* (2006.01)
*G01S 7/481* (2006.01)
*G03B 15/00* (2006.01)
*G03B 17/17* (2006.01)

(52) U.S. Cl.
CPC .......... *H04N 13/204* (2018.05); *G01S 7/4817* (2013.01); *G01S 17/89* (2013.01); *H04N 5/2226* (2013.01); *H04N 5/2251* (2013.01); *H04N 5/232* (2013.01); *H04N 5/33* (2013.01); *H04N 13/271* (2018.05); *G03B 15/006* (2013.01); *G03B 17/17* (2013.01)

(58) Field of Classification Search
CPC .... H04N 13/204; H04N 5/232; H04N 5/2226; G01S 7/4817; G01S 17/89
See application file for complete search history.

(56) References Cited

U.S. PATENT DOCUMENTS

2016/0107380 A1* 4/2016 Smoot ................... B29C 64/124
264/401

* cited by examiner

*Primary Examiner* — Nam D Pham
(74) *Attorney, Agent, or Firm* — JCIPRNET

(57) ABSTRACT

An image sensing module is provided. The imaging sensing module includes a rotation mechanism, a light source, a reflective device, and a depth detection member. The light source and the reflective device are fixed to the rotation mechanism and rotate around a rotation axis of the rotation mechanism as a center. The light source transmits a light beam to an object under test. The light beam is transmitted to the depth detection member through a reflection of the reflective device after the light beam is reflected by the object under test.

10 Claims, 3 Drawing Sheets

IMAGE SENSING MODULE

CROSS REFERENCE TO RELATED APPLICATION

This application claims the priority benefits of U.S. provisional application Ser. No. 62/516,075, filed on Jun. 6, 2017, and China application serial no. 201810207632.3, filed on Mar. 14, 2018. The entirety of each of the above-mentioned patent applications is hereby incorporated by reference herein and made a part of specification.

TECHNICAL FIELD

The disclosure relates to an optical module; more particularly, the disclosure relates to an image sensing module.

RELATED ART

In recent years, techniques associated with stereoscopic images have been applied to professional medical diagnosis and surgical operations, and the applications of these techniques have been expanded in people's daily lives, such as vehicle information displays, e-sports games, multimedia entertainment, etc. Through augmented reality (AR), virtual reality (VR), mixed reality (MR), and other technologies, an immersive experience is achieved. The stereoscopic images are mainly created by virtue of multimedia equipment, such as a stereo camera for capturing image information, and a depth map of the scene or object taken by the stereo camera is then generated through subsequent image processing. With the increasing popularity of AR in mobile phone application software, the mobile phones featuring the 3D depth sensing technology has been emerging in the market. The existing mobile phones are mostly equipped with front and rear lenses. In order to perform the basic function of taking photographs of normal scenes and objects and comply with the requirements for face recognition or video communication, both the front and rear lenses are required to be equipped with 3D depth sensors. Thereby, the mobile phones may become bulky and heavy, and the costs may increase.

SUMMARY

The disclosure provides an image sensing module capable of solving said issues.

In an embodiment of the invention, an image sensing module including a rotation mechanism, a light source, a reflective device, and a depth detection member is provided. The light source and the reflective device are fixed to the rotation mechanism and rotate around a rotation axis of the rotation mechanism as a center. The light source transmits a light beam to an object under test. The light beam is transmitted to the depth detection member through a reflection of the reflective device after the light beam is reflected by the object under test.

According to an embodiment of the invention, the reflective device includes a prism, a reflective mirror, or a beam splitter.

According to an embodiment of the invention, the depth detection member includes a lens assembly and a time-of-flight (TOF) sensor, and the light beam reflected by the reflective device is transmitted to the TOF sensor through the lens assembly.

According to an embodiment of the invention, a light exiting side of the light source and a light incident side of the reflective device are on the same side.

According to an embodiment of the invention, the light beam includes an infrared ray or a visible light beam.

According to an embodiment of the invention, the light beam is a pulse light beam, and the light source continuously transmits a plurality of the pulse light beams to the object under test.

According to an embodiment of the invention, the light beam is a pulse light beam, and the rotation axis of the rotation mechanism is parallel to an optical axis of the depth detection member.

According to an embodiment of the invention, the image sensing module further includes a rotation control module. The rotation control module controls rotation of the rotation mechanism.

According to an embodiment of the invention, the image sensing module includes a motor, a shape memory alloy, a piezoelectric material, or a magnetostrictive material.

According to an embodiment of the invention, the image sensing module is applied in an electronic apparatus to detect depth information of the object under test.

According to an embodiment of the invention, the image sensing module further includes at least one rotation control module.

In the image sensing module provided in one or more embodiments of the invention, the light source and the reflective device are fixed to the rotation mechanism, and the depth detection member is disposed on a transmission path of the light beam from the reflective device. Through rotating the rotation mechanism to divert the light source and the reflective device, the depth information of different locations may be obtained, and it is not necessary to arrange any additional depth detection member. Hence, compared to the related art whereby the number of 3D depth sensor is required to be increased to obtain the depth information of various locations, an embodiment of the image sensing module provided herein is conducive to the reduction of volume, weight, and costs.

To make the above features and advantages provided in one or more of the embodiments of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein

DETAILED DESCRIPTION OF EMBODIMENTS

Figure 1:
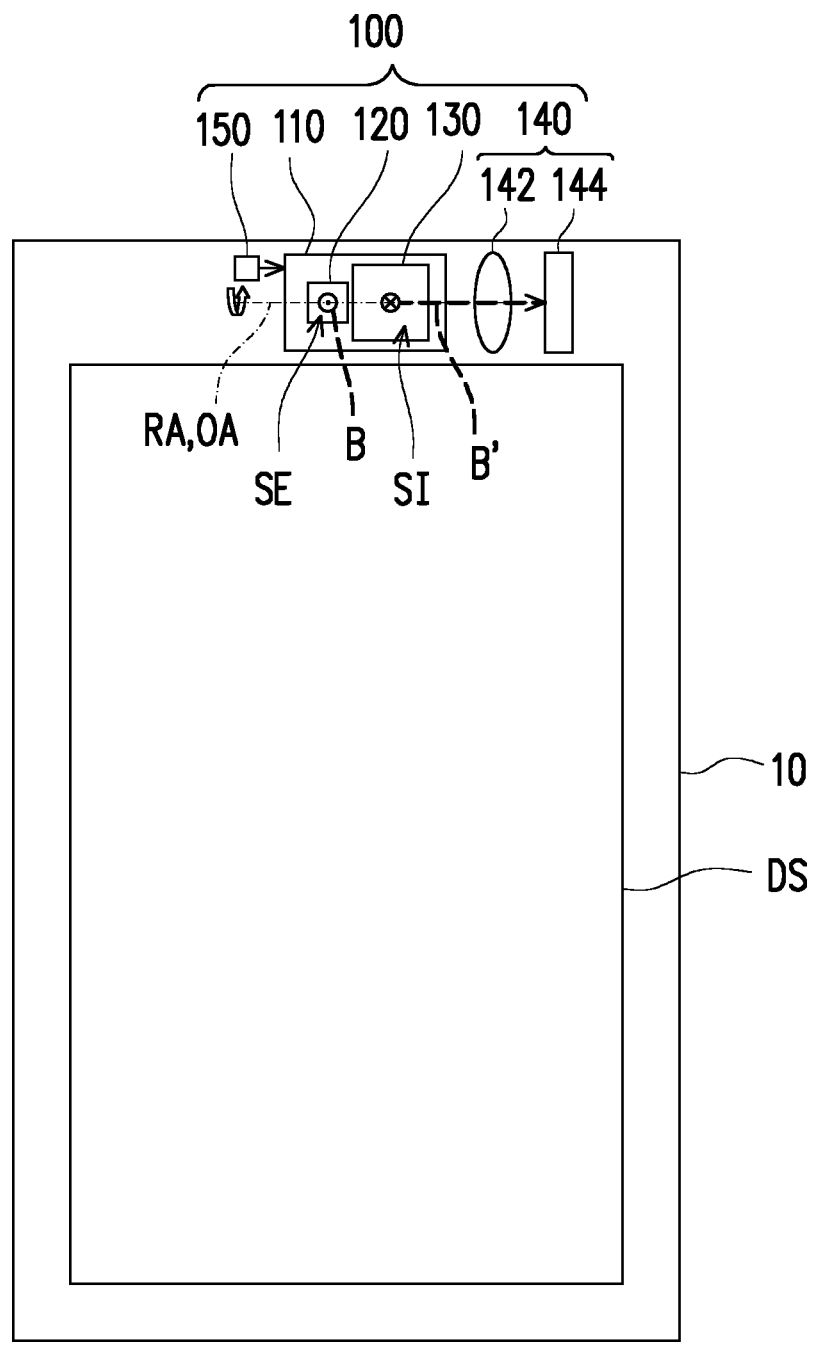
FIG. 1 is a schematic top view illustrating an electronic apparatus using an image sensing module provided in an embodiment of the invention.

FIG. 1 is a schematic top view illustrating an electronic apparatus using an image sensing module provided in an embodiment of the invention. With reference to FIG. 1, the image sensing module 100 provided in the embodiment is a depth detection module and is adapted to be applied to obtain depth information of an object under test. The image sensing module 100 may be applied in an electronic apparatus 10, so that the electronic apparatus 10 is able to perform a depth detection function. FIG. 1 schematically illustrates that the electronic apparatus 10 is a portable device having a display screen DS, the portable device is, for instance, a mobile phone, a tablet computer, or a laptop, which should however not be construed as a limitation in the disclosure. The display screen DS is adapted to provide image frames. In an embodiment, the display screen DS may also perform a touch sensing function. In other words, the display screen DS may include a display module or a touch sensing display module.

The image sensing module 100 is disposed on one side of the display screen DS. For instance, the front and rear lenses of the electronic apparatus 10 may share the image sensing module 100, so that the front and rear lenses of the electronic apparatus 10 are both able to perform the depth detection function.

The imaging sensing module 100 includes a rotation mechanism 110, a light source 120, a reflective device 130, and a depth detection member 140. The rotation mechanism 110 has a rotation axis RA, and the rotation mechanism 110 is adapted to drive the device fixed to the rotation mechanism 110 to rotate around the rotation axis RA as a center. FIG. 1 schematically illustrates the rotation mechanism 110 shaped as a cuboid. However, the way to implement the rotation mechanism 110 may be modified according to actual requirements and need not be limited to what is shown in FIG. 1.

The light source 120 is adapted to provide a light beam B required for sensing the depth. The light source 120 may include a visible light source or an invisible light source. The invisible light source may be an infrared light source, which should not be construed as a limitation in the disclosure. Correspondingly, the light beam B may include the visible light or the infrared ray. In addition, the light beam may be a pulse light beam, and the light source 120 is adapted to continuously transmit a plurality of the pulse light beams to the object under test (not shown), so as to obtain the depth information of the object under test. A method of obtaining the depth information of the object under test will be elaborated hereinafter.

The reflective device 130 is adapted to divert the light beam B' reflected by the object under test, so that the light beam B' is transmitted toward the depth detection member 140. This is conducive to the reduction of the thickness of the image sensing module 100. The reflective device 130 may include any device that includes a reflective surface (not shown), the reflective device 130 is, for instance, a prism, a reflective mirror, or a beam splitter; however, this should not be construed as a limitation in the disclosure.

The depth detection member 140 is adapted to receive the light beam B' reflected by the object under test, so that the image sensing module 100 may obtain the depth information of the object under test. The depth detection member 140 may include a lens assembly 142 and a time-of-flight (TOF) sensor 144, and the light beam B' reflected by the reflective device 130 is transmitted to the TOF sensor 144 through the lens assembly 142. The lens assembly 142 may include one or more lenses. FIG. 1 schematically illustrates one lens, while the type and the number of devices in the lens assembly are not limited herein.

The light source 120 and the reflective device 130 are fixed to the rotation mechanism 110 and are adapted to rotate around the rotation axis RA of the rotation mechanism 110 as a center. The light exiting side SE of the light source 120 and the light incident side SI of the reflective device 130 are, for instance, on the same side. In other words, the light exiting side SE of the light source 120 and the light incident side SI of the reflective device 130 face the same direction (e.g., both facing the object under test of which the depth information is to be obtained). Thereby, after the light beam B emitted by the light source 120 (e.g. the light beam B emitted out of the paper) is reflected by the object under test, the reflective device 130 is able to receive the light beam B' reflected by the object under test (e.g. the light beam B' enters the paper). The depth detection member 140 is disposed on the transmission path of the light beam B' from the reflective device 130 to receive the light beam B' reflected by the reflective device 130.

In the embodiment, the reflective device 130 is disposed between the light source 120 and the depth detection member 140. Besides, the rotation axis RA of the rotation mechanism 110 is parallel to an optical axis OA of the depth detection member 140, and the rotation axis RA of the rotation mechanism 110 and the optical axis OA of the depth detection member 140 are, for instance, coaxial. However, the relative arrangement of the light source 120, the reflective device 130, and the depth detection member 140 may be changed according to actual requirements and should not be limited to what is shown in FIG. 1. For instance, in FIG. 1, the light source 120 may be disposed on one side of the reflective device 130 away from the display screen DS, such that the reflective device 130 is located between the light source 120 and the display screen DS. Alternatively, the light source 120 may be disposed between the reflective device 130 and the display screen DS. Other devices may also be arranged to change the light path according to actual demands. Namely, the rotation axis RA of the rotation mechanism 110 and the optical axis OA of the depth detection member 140 need not be coaxial.

Figure 2A:
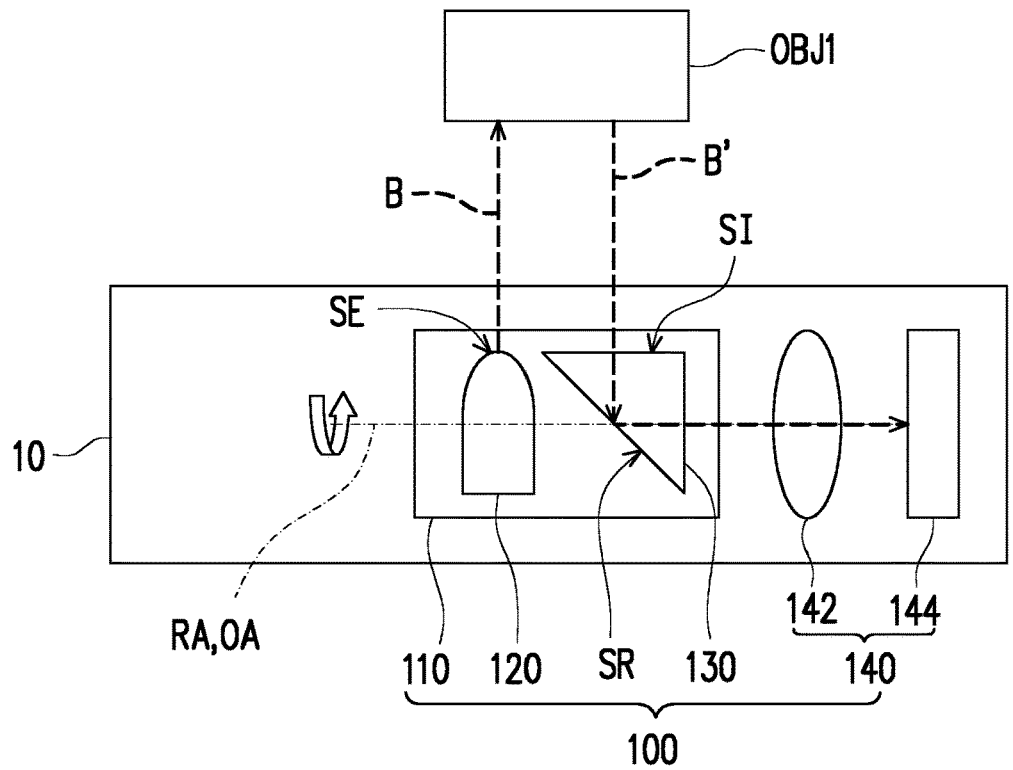
FIG. 2A and FIG. 2B are schematic cross-sectional views illustrating the image sensing module depicted in FIG. 1 rotated to different orientations.
Figure 2B:
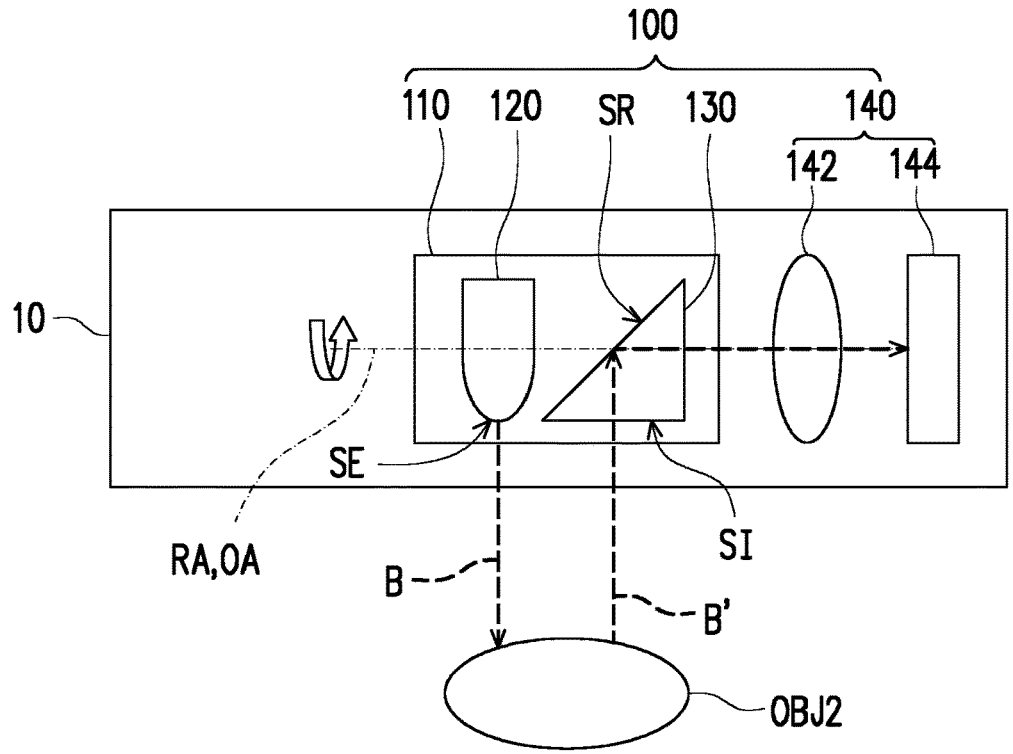

The method of obtaining the depth information of different orientations by the image sensing module 100 is explained hereinafter with reference to FIG. 2A and FIG. 2B. FIG. 2A and FIG. 2B are schematic cross-sectional views illustrating the image sensing module depicted in FIG. 1 rotated to different orientations. Here, FIG. 2A illustrates that the image sensing module 100 obtains the depth information of the object OBJ1 under test in front of the electronic apparatus 10, and FIG. 2B illustrates that the image sensing module 100 obtains the depth information of the object OBJ2 under test behind the electronic apparatus 10.

When it is required to obtain the depth information of the object OBJ1 under test in front of the electronic apparatus 10 (or the depth information of the object OBJ2 under test behind the electronic apparatus 10), the rotation mechanism 110 may be rotated to divert the light source 120 and the reflective device 130, so that the light source 120 and the reflective device 130 face the object OBJ1 under test (or the object OBJ2 under test). The rotation mechanism 110 may be manually rotated by a user. Alternatively, as shown in FIG. 1, the image sensing module 100 may further include a rotation controlling module 150 to control the rotation of the rotation mechanism 110. The rotation controlling module 150 controls the direction of rotation, the angle of rotation, and the timing of rotation, for instance. Specifically, the image sensing module 100 may instruct the rotation control module 150 to rotate the rotation mechanism 110 according to a command of the user. The rotation control module 150 may include a shape memory alloy, a piezoelectric material, or a magnetostrictive material and may control the deformation of the shape memory alloy, the piezoelectric material, or the magnetostrictive material according to the electrical signal sent from the rotation control module 150, so as to control the rotation of the rotation mechanism 110. However, this should not be construed as a limitation in the disclosure. In an embodiment, the rotation control module 150 may include a motor to control the rotation of the rotation mechanism 110.

With reference to FIG. 2A, when it is required to obtain the depth information of the object OBJ1 under test in front of the electronic apparatus 10, the light source 120 and the reflective device 130 are rotated by the rotation mechanism 110 and face the object OBJ1 under test in front of the electronic apparatus 10. The light source 120 transmits the light beam B toward the object OBJ1 under test. After the light beam B is reflected by the object OBJ1 under test (and the light beam B' with the depth information is generated), the light beam B' is transmitted to the depth detection member 140 through the reflection by the reflection surface SR of the reflective device 130. The depth detection member 140 may determine the distance between the object OBJ1 under test and the electronic apparatus 10 through analyzing the phase difference or the difference between the time at which the light beam B is transmitted by the light source 120 and the time at which the light beam B' is received by the depth detection member 140.

With reference to FIG. 2B, when it is required to obtain the depth information of the object OBJ2 under test behind the electronic apparatus 10, the light source 120 and the reflective device 130 are rotated by the rotation mechanism 110 and face the object OBJ2 under test behind the electronic apparatus 10. The light source 120 transmits the light beam B toward the object OBJ2 under test. After the light beam B is reflected by the object OBJ2 under test (and the light beam B' with the depth information is generated), the light beam B' is transmitted to the depth detection member 140 through the reflection by the reflective device 130. The depth detection member 140 may determine the distance between the object OBJ2 under test and the electronic apparatus 10 through analyzing the phase difference or the difference between the time at which the light beam B is transmitted by the light source 120 and the time at which the light beam B' is received by the depth detection member 140.

Through rotating the rotation mechanism 110 to divert the light source 120 and the reflective device 130, the depth information of different locations may be obtained, and it is not necessary to additionally increase the number of the depth detection member 140. For instance, in the embodiment shown in FIG. 2A and FIG. 2B, one depth detection member 140 may be used to obtain the depth information in front of and behind the electronic apparatus 10. Hence, compared to the related art whereby the number of 3D depth sensor is required to be increased to obtain the depth information of various locations, an embodiment of the image sensing module 100 provided herein is conducive to the reduction of volume, weight, and costs. In other words, the image sensing module 100 provided in the embodiment may be applied to reduce the thickness of the electronic apparatus 10, and the cost of the electronic apparatus 10 for performing the depth detection function may be lowered down.

Figure 3:
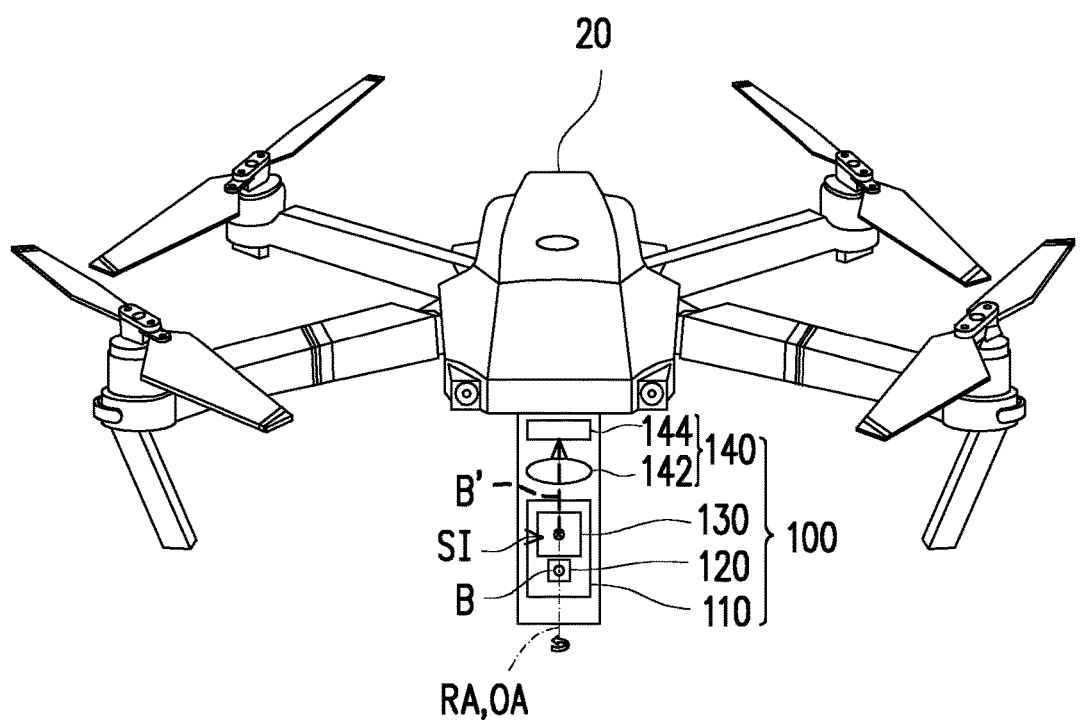
FIG. 3 is a schematic view illustrating another electronic apparatus using an image sensing module provided in an embodiment of the invention.

FIG. 3 is a schematic view illustrating another electronic apparatus using an image sensing module provided in an embodiment of the invention. With reference to FIG. 3, the electronic apparatus 20 schematically shown therein is a drone. Besides, the image sensing module 100 is arranged in a way that allows the rotation axis RA of the rotation mechanism 110 and the optical axis OA of the depth detection member 140 to be perpendicular to the electronic apparatus 20, respectively. Under this architecture, the light source 120 of the image sensing module 100 may be disposed on a plane below the electronic apparatus 20, for example, and by rotating the rotating mechanism 110, the image sensing module 100 may obtain 360-degree depth information on the plane. Further, the image sensing module 100 may also be equipped with another rotation control module, and the light source 120 is deviated from the rotation axis RA (or the optical axis OA) by a specific angle. As such, the image sensing module 100 may also obtain 180-degree depth information right below the plane. In another embodiment, the image sensing module 100 may be arranged in a way that allows the rotation axis RA of the rotation mechanism 110 and the optical axis OA of the depth detection member 140 to be parallel to the electronic apparatus 20, respectively.

Note that the application range of the image sensing module 100 is not limited to portable devices and drones. For instance, the image sensing module 100 can also be applied to a self-driving car or any apparatus that requires the depth detection function, and at least one rotation control module is arranged according to the requirements of the apparatus, so as to acquire the corresponding depth information of the apparatus at a specific location and/or space.

In the image sensing module provided in an embodiment of the invention, through rotating the rotation mechanism to divert the light source and the reflective device, the depth information of different locations may be obtained, and it is not necessary to arrange any additional depth detection member. Hence, compared to the related art whereby the number of 3D depth sensor is required to be increased to obtain the depth information of various locations, an embodiment of the image sensing module provided herein is conducive to the reduction of volume, weight, and costs. In other words, the image sensing module provided in the embodiment may be applied to reduce the thickness of the electronic apparatus, and the cost of the electronic apparatus for performing the depth detection function may be lowered down.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. An image sensing module, comprising:
   a rotation mechanism;
   a light source;
   a reflective device; and
   a depth detection member,
   wherein the light source and the reflective device are fixed to the rotation mechanism and rotate around a rotation axis of the rotation mechanism as a center, the light source transmits a light beam to an object under test, and the light beam is transmitted to the depth detection member through a reflection of the reflective device after the light beam is reflected by the object under test,
   wherein the depth detection member comprises a lens assembly and a time-of-flight sensor, and the light beam reflected by the reflective device is transmitted to the time-of-flight sensor through the lens assembly.

2. The image sensing module as recited in claim 1, wherein the reflective device comprises a prism, a reflective mirror, or a beam splitter.

3. The image sensing module as recited in claim 1, wherein a light exiting side of the light source and a light incident side of the reflective device are on a same side.

4. The image sensing module as recited in claim 1, wherein the light beam comprises an infrared ray or a visible light beam.

5. The image sensing module as recited in claim 1, wherein the light beam is a pulse light beam, and the light source continuously transmits a plurality of the pulse light beams to the object under test.

6. The image sensing module as recited in claim 1, wherein the rotation axis of the rotation mechanism is parallel to an optical axis of the depth detection member.

7. The image sensing module as recited in claim 1, further comprising:

a rotation control module controlling rotation of the rotation mechanism.

8. The image sensing module as recited in claim 7, wherein the rotation control module comprises a motor, a shape memory alloy, a piezoelectric material, or a magnetostrictive material.

9. The image sensing module as recited in claim 1, wherein the image sensing module is applied in an electronic apparatus to detect depth information of the object under test.

10. The image sensing module as recited in claim 9, wherein the electronic apparatus comprises at least one rotation control module.

* * * * *